J. H. STANFIELD.
MAT WEAVING MACHINE.
APPLICATION FILED NOV. 19, 1915.

1,304,216.

Patented May 20, 1919.
8 SHEETS—SHEET 3.

Fig. 3.

Witnesses:
Robert F. Weir
Arthur W. Carlson

Inventor
Jasper H. Stanfield
Williams & Bradbury
Attys

UNITED STATES PATENT OFFICE.

JASPER H. STANFIELD, OF MUSKEGON, MICHIGAN, ASSIGNOR TO JESSE B. ALTON, OF WINNETKA, ILLINOIS.

MAT-WEAVING MACHINE.

1,304,216.  Specification of Letters Patent.  Patented May 20, 1919.

Application filed November 19, 1915. Serial No. 62,324.

*To all whom it may concern:*

Be it known that I, JASPER H. STANFIELD, a citizen of the United States, residing at Muskegon, in the county of Muskegon and State of Michigan, have invented a certain new and useful Improvement in Mat-Weaving Machines, of which the following is a full, clear, concise, and exact description, reference being had to the accompanying drawings, forming a part of this specification.

My invention relates to weaving machines, particularly mat weaving machines of the type disclosed in my co-pending patent application, Serial No. 845,388, filed June 16, 1914, and the objects of my present invention are to provide a highly improved and generally more satisfactory machine of this class.

The herein described embodiment of my invention differs essentially from the weaving machine disclosed in my co-pending application aforesaid, in that in my present machine I do not utilize a co-called "winding tube" for twisting the "plug" yarn around the warp strands during the weaving operation. My present invention provides different and improved instrumentalities for accomplishing this step in the mat weaving operation. As will hereinafter more fully appear, my present machine comprises a plurality of hooks coöperating with a yarn carrying element, preferably in the form of a tube, to suitably manipulate the yarn supplied by the tube to form the so-called yarn "plugs". The aforesaid tube is at proper intervals moved transversely of the warp strands and in the shed of the warp, and as the tube is thus moved between the warp the hooks are successively depressed so that they lie beneath the yarn carrying tube. As will be hereinafter fully explained, as the yarn carrying tube is retracted over its former path, leaving plug yarn therebehind, the hooks are successively raised to form loops between and around the strands of the upper warp. Coöperating with the hooks are knives arranged to cut the loops thus formed into "plugs". It will be understood that in combination with the devices just described I provide suitable warp carrying and shed changing mechanisms, shuttle mechanism, batten, etc., all of which will be referred to in more detail in the following description wherein reference is made to the accompanying drawings in which.

Similar characters of reference refer to similar parts throughout the several views.

Before proceeding to a detailed description of the drawings it will be well to point out that certain parts of my herein described mat weaving machine need not necessarily differ essentially from the corresponding parts shown and fully described in my co-pending application hereinbefore referred to, and, therefore, I have deemed it unnecessary in my present application to illustrate certain of these parts in detail except in so far as is necessary to clearly illustrate the construction and coöperation of those parts that characterize and constitute my present invention.

Referring to the drawings, the framework which supports the operating parts of the machine is illustrated at 20. Mounted in horizontal bearings carried by the framework 20 is a power shaft 21 from which at the proper times power is supplied to the several operating parts of the machine. At its rear end the shaft 21 is, of course, provided with a pulley, or other suitable devices, whereby connection may be made with an engine, electric motor, or other source of power. The several mechanisms that are driven from the power shaft 21, and which differentiate from the disclosure of my co-pending application, will be taken up one after another without bringing out in any more detail than is necessary their relation to the several other parts. I will then describe the operation of the machine, bringing out the manner in which the several parts coöperate in the weaving of a mat.

The shed changing mechanisms of my present machine are the front and rear heddles 22 and 23. These heddles need not necessarily be different in construction and mode of operation from the heddles forming a part of the machine shown in my co-pending application hereinbefore referred to.. However, in the present embodiment of my invention I have illustrated a new arrangement for effecting the operation of the heddles. The heddle operating mechanism comprises an intermittent gear 24 with which coöperates an intermittent pinion 25 mounted upon a shaft disposed above the plane of the main operating shaft 21. It will be seen that the intermittent pinion 25 is provided with two diametrically opposite surfaces not provided with gear teeth. Therefore, as will be understood by any one skilled in the art to which my invention relates, every time the intermittent gear 24 makes one complete revolution the intermittent pinion 25 is moved through an angle of 180 degrees. Fixed with respect to the intermittent pinion 25 is a suitable crank arm which is clearly illustrated at 26 in Fig. 2. Connected with this crank arm are links 27 and 28, as illustrated. The end of the link 27 opposite its associated crank arm 26 has pivotal connection with the crank arm 29 fixed upon a shaft 30. Also fixed upon the shaft 30 is a lever 31, the free end of which is connected by means of a link 32 with the lower end of a bracket 33 secured to the lower end of the front heddle 22. The link 28, which forms a part of the mechanism for controlling the operation of the rear heddle 23, is connected with the rear heddle 23 by instrumentalities corresponding in all respects to the devices for connecting the link 27 with the heddle 22, and, therefore, instead of going into a detailed description of the means for connecting the link 28 with the heddle 23 I have applied the same reference characters to the devices interposed between the link 28 and the heddle 23 as have been applied to the connecting devices interposed between the link 27 and its heddle 22, adding the letter "a" to the several reference characters. Due to the arrangement just described, it will be seen that when the intermittent pinion 25 is turned through an angle of 180 degrees the positions of the front and rear heddles 22 and 23 will be reversed and that when the intermittent pinion is turned through an additional 180 degrees the heddles are returned to their former positions. As is well understood by persons skilled in the art to which my invention relates the operation of the heddles serves to effect the changing of the warp shed.

The several warp strands are led through the heddles 22 and 23 exactly as in the machine shown in my co-pending application, hereinbefore referred to, and pass over a drum 34 having journals at 35 in the machine frame 20. It will be understood, of course, that when any portion of the warp reaches the roller 34 it will have interwoven with it the "plugs" and fillers which together with the warp constitute a woven mat, the plugs and fillers being interwoven with the warp before it reaches the roller 34.

Figures 6, 14:
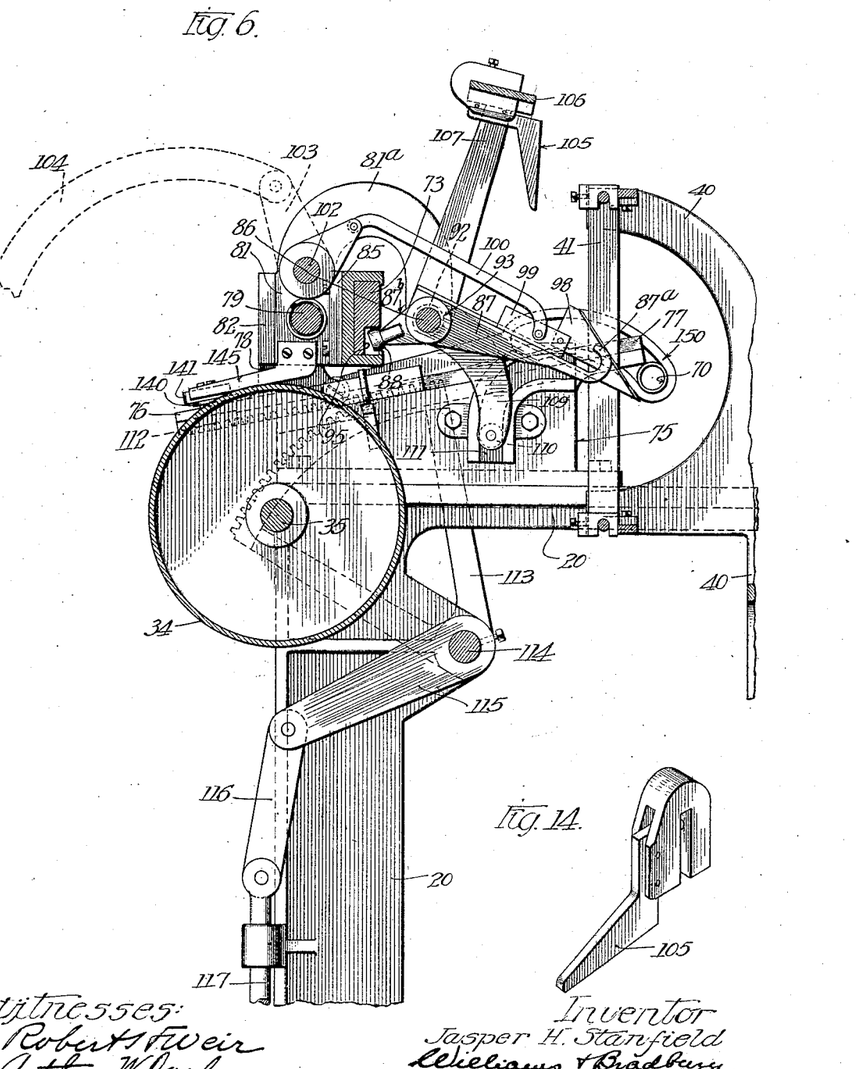
Fig. 6 illustrates the parts shown in Fig. 5 in changed position, the batten being illustrated in this view as having been moved forwardly by its associated controlling devices.
Fig. 14 is a detail view in perspective of one of the several fingers that lie in the plane of the upper warp when the hooks are lifted and thus prevent the warp strands from being deflected from their proper plane.
Figures 7, 15:
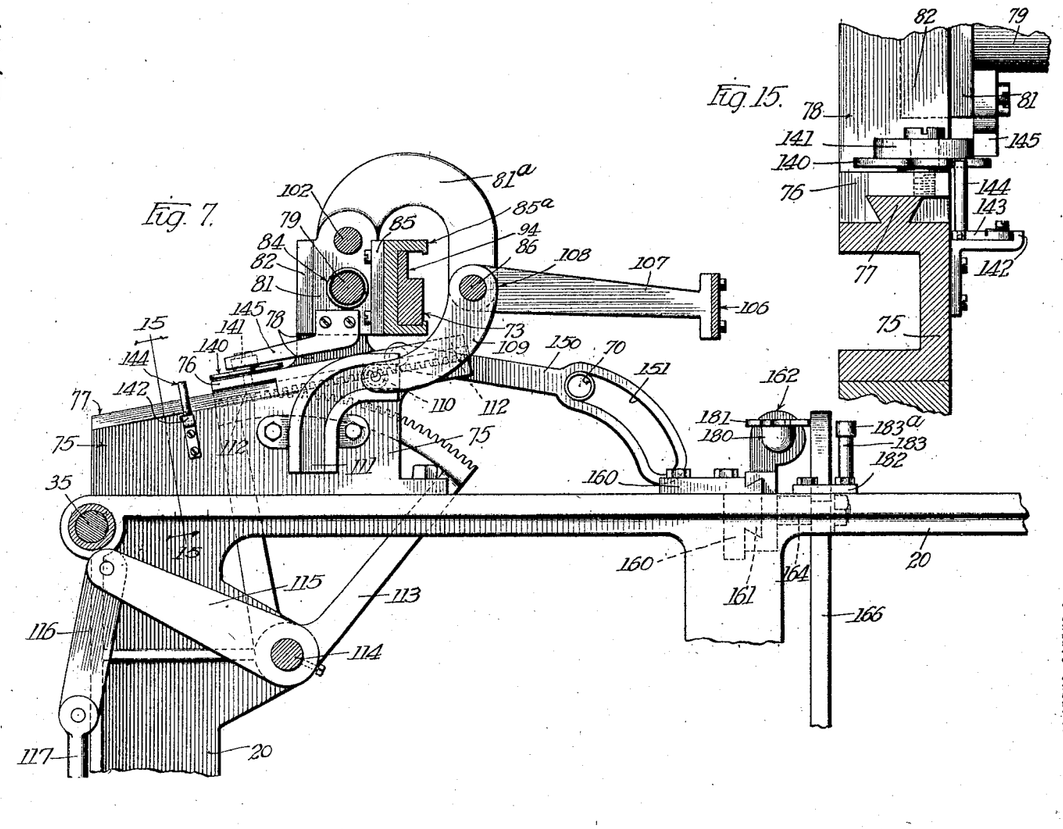
Fig. 7 is a cross sectional view taken on the line 7—7 of Fig. 3, and looking in the direction indicated by the arrows.
Fig. 15 is a fragmentary detail view taken on the line 15—15 of Fig. 7 and illustrating the connection between the machine frame and the devices that slide thereon, as will be hereinafter explained.

The batten, or lathe, has not been illustrated in detail in my present application, but is shown at 40 in Fig. 6. This batten does not necessarily differ in any respect from the batten illustrated in my co-pending application above referred to, and it will be sufficient to say that the batten is provided with a plurality of blades 41 between which extend the warp strands 42, most clearly illustrated in Fig. 4. In my co-pending application the batten, or lathe frame, is pivoted to the machine frame and is provided at its lower end with a roller serving as a follower for a cam fixed upon the main driving shaft. Associated with the lathe frame of that application I illustrated springs normally tending to hold the batten or lathe in retracted position and its follower roller in engagement with the cam. The cam with which the roller coöperates is so constructed that at the proper time in the operation of the weaving machine the batten is first moved forward at a comparatively slow rate to push the "fillers" and "plugs" up against the previously woven portion of the mat, the batten being then permitted to drop back slightly and being then brought ahead against the mat to deliver a sharp blow. I contemplate operating the batten of my present machine in practically the same manner as I operate the batten shown in my co-pending application, and, therefore, it will be unnecessary to illustrate in any considerable detail the devices for operating the batten forming a part of my present machine. I will say, however, that in case it is undesirable to provide springs for normally holding the batten in retracted position, the cam which coöperates with the lower end of the batten, or lathe frame, may be provided with a cam slot as distinguished from merely a cam surface in order to effect positive movement of the batten in both directions.

Supported by the machine frame 20 and projecting from the left side thereof in a horizontal plane (Fig. 1) is a bar 45 provided with a dovetailed rib 46 on its front face. Mounted upon the bar 45 and provided with portions arranged to coöperate with the dovetailed rib 46 of the bar 45 is a block 47 which, as will more fully hereinafter appear, is connected with the "plug" yarn carrying tube and also with the so-called sliding cam bar which coöperates to effect the operation of the hooks, as will be presently made apparent. Retained in the block 47 by a plurality of set screws 48 and held in engagement with the lower chamfered surface of the rib 46 is a wearing strip 49 the function of which will be readily understood.

Figures 1, 8, 9, 10:
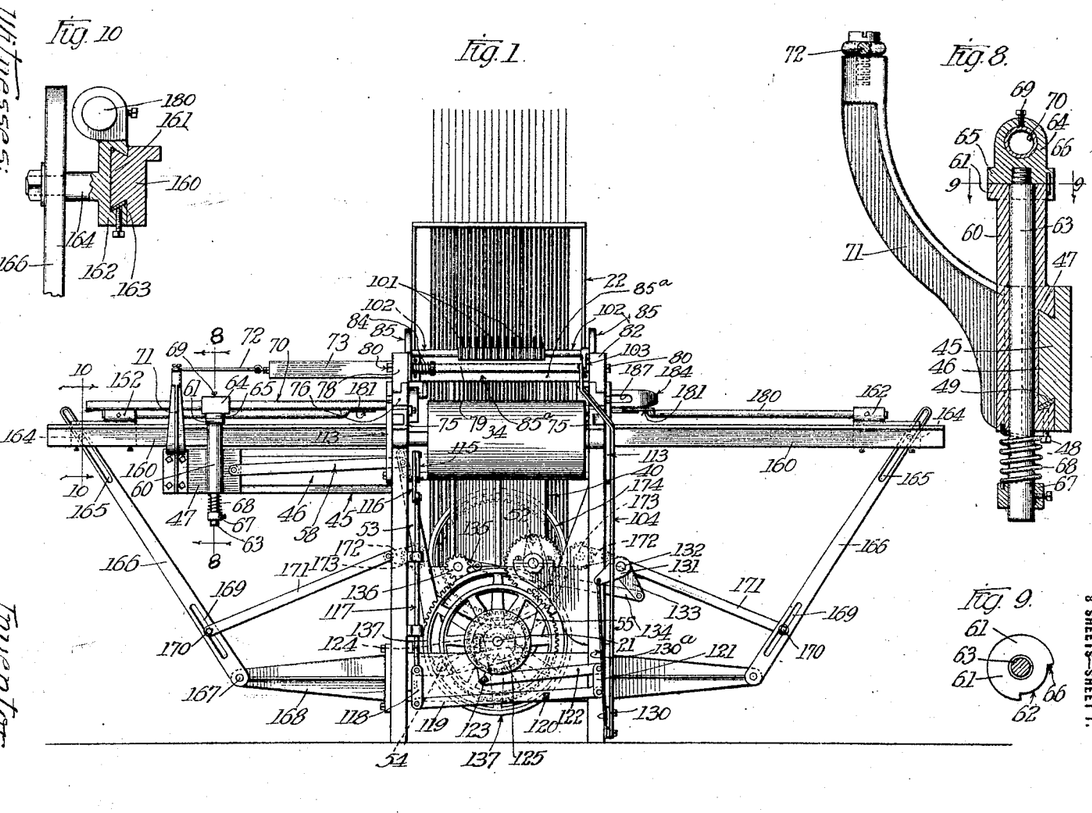
Figure 1 is a view in front elevation of my improved mat weaving machine.
Fig. 8 is a cross sectional view taken on the line 8—8 of Fig. 1, and looking in the direction indicated by the arrows, this view illustrating the arrangement whereby the tube for carrying the plug yarn between the shed of the warp may be swung out of the path of the batten when the latter is operated.
Fig. 9 is an isolated detail view taken on the line 9—9 of Fig. 8, and looking in the direction indicated by the arrows.
Fig. 10 is a cross sectional view taken on the line 10—10 of Fig. 1, illustrating in part the connection between the shuttle operating devices and the source of power.
Figure 2:
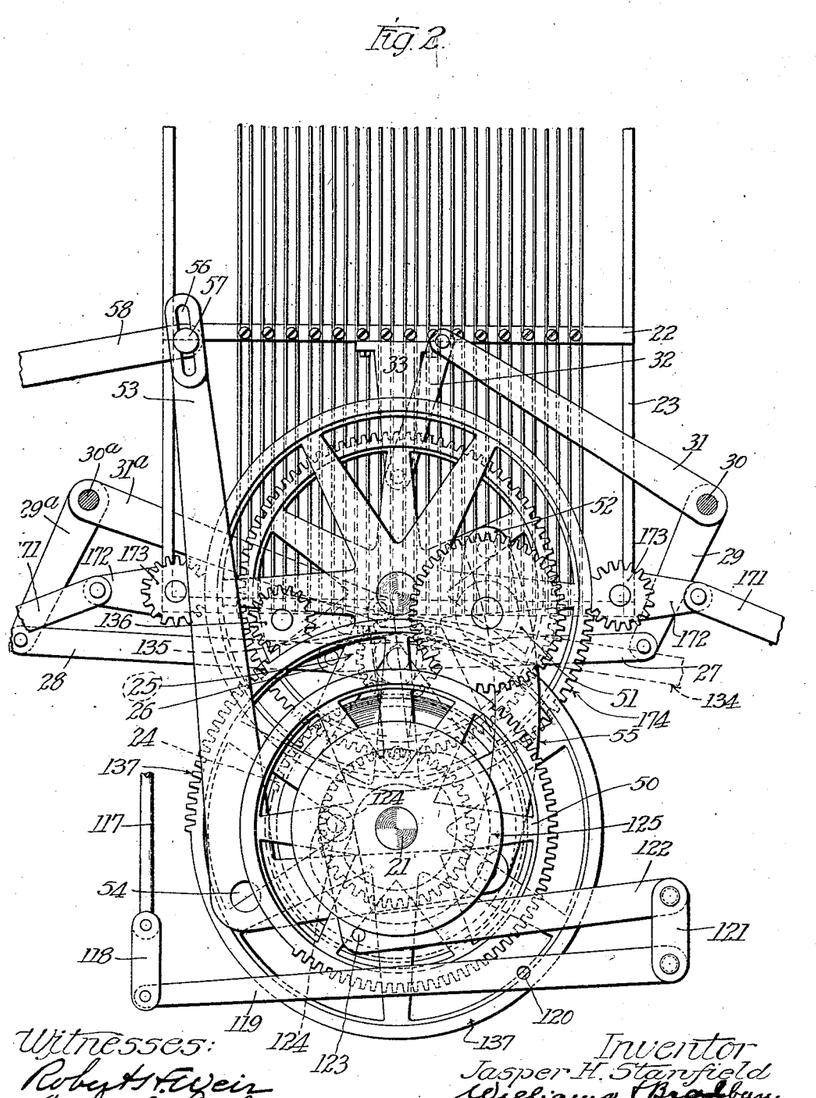
Fig. 2 is a more or less diagrammatic view illustrating the mechanisms whereby all of the operating devices of the machine are controlled from a common shaft.

The devices for effecting the reciprocation of the block 47 with respect to the bar 45 are most clearly illustrated in Figs. 1 and 2. Fixed upon the main shaft 21 is an intermittent gear 50 with which coöperates an intermittent pinion 51, the intermittent pinion 51 being mounted upon a shaft disposed above the plane of the main shaft 21 and having fixed with respect thereto a crank arm 52. Illustrated at 53 and pivoted at 54 is a bell crank lever, the shorter arm of which is connected by link 55 with the crank arm 52. The longer arm of the bell crank lever 53 is provided with a slot 56 and engaging in said slot is a pin 57 carried by one end of the link 58, the other end of which is pivotally connected to the reciprocating block 47. It will be understood from the connections just described that each time the intermittent pinion 51 is passed through an angle of 360 degrees the bell crank lever 53 and its associated devices will operate to move the block 47 across the bar 45 from left to right and return it to normal position. Inasmuch as the reciprocating head 47 controls the operation of the devices for handling the plug yarn, I contemplate having the connection between the bell crank lever 53 and the link 58 such that the reciprocating head may temporarily be disconnected from the operating shaft 21 when it is desirable to "face up" the warp before proceeding to weave a mat comprising plugs. Just what is meant by "facing up" I think will be readily understood by one skilled in the art to which my invention relates. However, I will say that when I "face up" the warp I merely operate the shed changing mechanism, shuttle mechanism and batten without actuating the plug yarn controlling devices and thus build up a structure against which all the elements of the mat may be woven.

Preferably formed integral with the reciprocating head 47 is a cylinder 60 provided at its upper end with a flange 61 having a portion thereof cut away, as is most clearly illustrated at 62 in Fig. 9. Extending through the cylinder 60, as is most clearly illustrated in Fig. 8, is a shaft 63 having fixed to its upper end a head 64 provided with a base flange 65 resting upon the flange 61 of the cylinder 60. The flange 65 of the head 64 carries a pin 66 arranged to travel in the cut away portion 62 of the flange 61. Thus it will be seen that the head 64 is capable of limited movement with respect to the cylinder 60. Fixed upon the lower end of the shaft 63 is a collar 67, and having its lower end engaging in the collar 67 is a helical spring 68 disposed around the shaft 63 and having its upper end engaging in the lower end of the cylinder 60. It will thus be seen that the spring 68 normally tends to hold the head 64 in the position illustrated in Figs. 1 and 8. Extending through the head 64 and fixed with respect thereto by means of a set screw 69 is a hollow rod, or tube, 70 which extends from the head 64 to the right (Fig. 1) and is adapted to pass transversely of the warp and in the shed of the warp when the head 47 journeys from left to right and right to left, as has previously been explained.

Figures 4, 11:
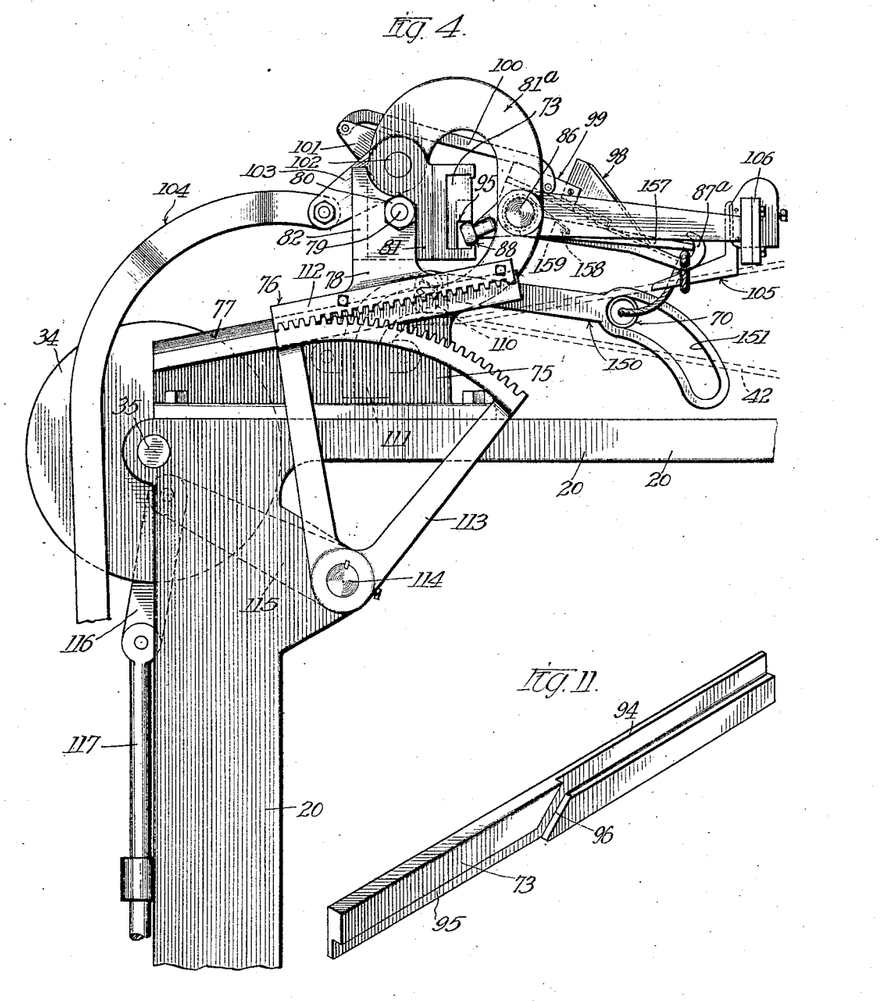
Fig. 4 is a side elevational view taken on the right hand side of Fig. 3.
Fig. 11 is an isolated perspective view of the transversely moving cam bar that controls the operation of the hooks in timed relation to the "plug" yarn tube.

Carried by the head 47 is a bracket 71, the upper end of which is connected by means of a link 72 with the left end (Fig. 1) of a sliding cam bar 73, illustrated in more detail in Fig. 11. The function of the sliding cam bar will be more fully hereinafter explained, but I wish at this point to bring out the fact that the sliding cam bar 73 and the yarn carrying tube 70 are operated in unison.

Figure 3:
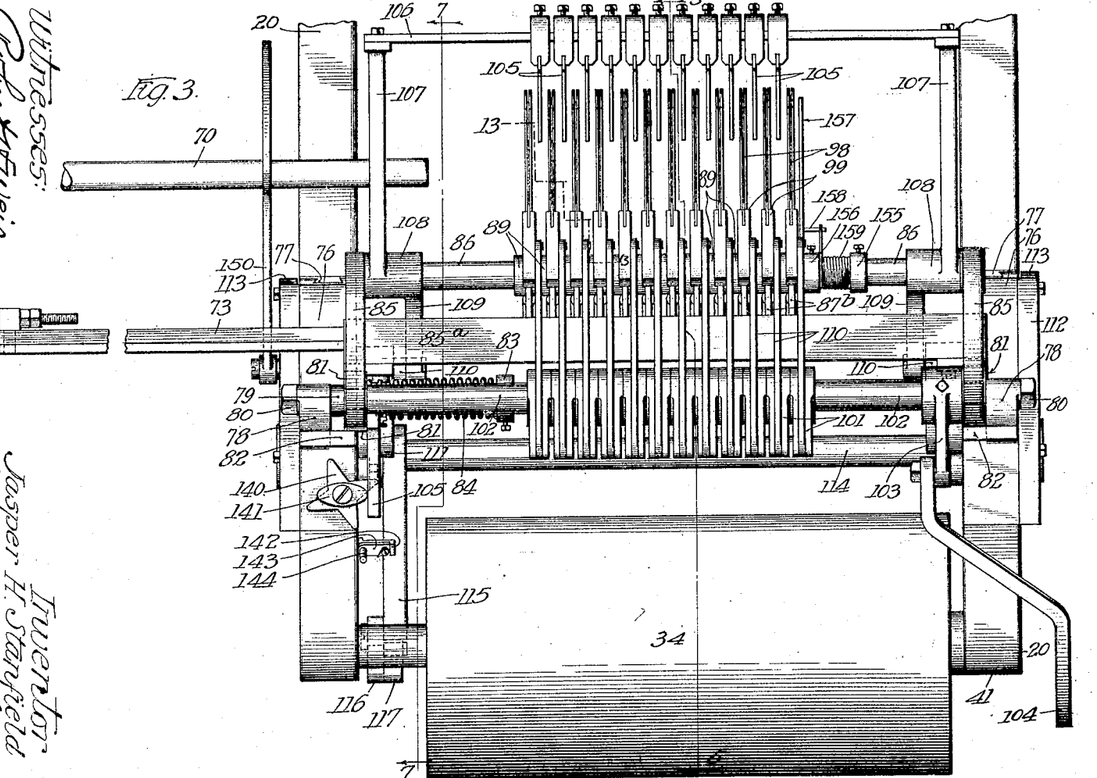
Fig. 3 is a fragmentary top plan view of the machine, this view illustrating more particularly the devices for handling the "plug" yarn.

As is most clearly illustrated in Figs. 4, 5, 6, 7, and 15, the machine frame 20 at its forward end carries a pair of brackets, illustrated at 75—75, these brackets serving as ways for certain mechanism supported by bars 76. Each of the brackets 75 is provided on its upper inclined surface with a dovetailed rib 77, and each of the bars 76 is provided with portions adapted to coöperate with the dovetailed rib of its associated bracket 75, as is most clearly illustrated in Fig. 7. Formed integral with each of the slidable bars 76 is an upwardly projecting bracket 78. At 79 is illustrated a shaft having each of its ends fixed in one of the brackets 78 and preferably secured by nuts 80—80, as illustrated. The brackets 78 and shaft 79 serve to guide and support a laterally moving structure comprising a pair of blocks 81—81 freely mounted upon the shaft 79. It will be noted that each of the brackets 78 comprises an inwardly turned flange 82, and these flanges coöperating with the adjacent plane surfaces of their associated blocks 81 serve to prevent oscillation of the blocks 81 without, however, at the same time preventing the structure comprising the blocks 81 from being moved longitudinally of the shaft 79 and transversely of the machine within certain limits. Fixed upon the shaft 79 is a collar 83, and interposed between the collar 83 and the adjacent one of the blocks 81 is a coiled spring 84 which normally tends to hold the blocks 81 in their extreme left hand position (Fig. 3). Each of the blocks 81 is provided with an integral bracket 85 secured by screws, bolts, or otherwise, to a bar 85ᵃ which serves rigidly to connect the blocks 81 and at the same time constitute a track or guide for the sliding cam bar 73, which has previously been referred to. This construction is most clearly illustrated in Fig. 6 of the drawings.

As is most clearly illustrated in Figs. 3, 4, 5, and 6, each of the blocks 81 has formed integral therewith a substantially U shaped arm 81ᵃ extending over the bar 86 and sliding cam bar 73, the rear ends of the U shaped elements 81ᵃ serving to journal a shaft 86, which shaft 86 carries the hooks that coöperate with the yarn carrying tube 70, previously referred to, to properly manipulate the "plug" yarn during the weaving operation. As is most clearly illustrated in Figs. 3, 4, 5, 6, 12, and 13, the several hook members indicated by the reference numeral 87 are mounted upon the shaft 86, but are capable of movement independently of the shaft. Each of the hook elements is provided at its rear end with an up-turned hook portion 87ᵃ, and is provided at its forward end with an extension 87ᵇ carrying a roller 88 adapted to engage in the slot of the sliding cam bar 73. Associated with each of the hook elements 87 is a collar 89 fixed upon the shaft 86 by a set screw 90, or other equivalent means, the said collar being provided with a reduced portion 91 upon which is journaled its associated hook element 87, each of the hook elements being provided with an aperture 92 adapted to pass over the reduced portion 91 of its collar 89, as is most clearly illustrated in Figs. 12 and 13. A nut 93 serves to retain each of the hook elements upon its associated collar 89.

Figures 5, 12, 13:
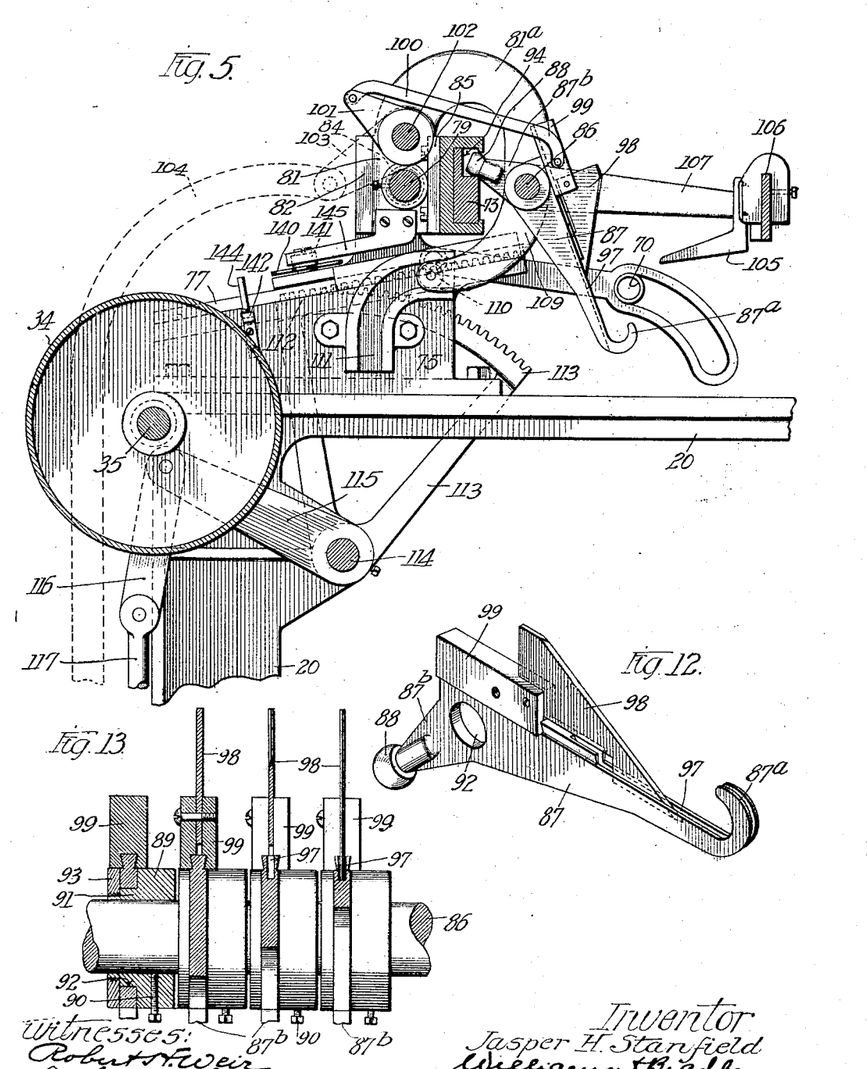
Fig. 5 is a view partly in section and partly in elevation taken on the line 5—5 of Fig. 3, and looking in the direction indicated by the arrows.
Fig. 12 is a detail view in perspective of one of the hooks controlled by the cam bar shown in Fig. 11.
Fig. 13 is a fragmentary view partly in section and partly in elevation taken on the broken line 13—13 of Fig. 3, and clearly illustrating the connection between the several hooks and their associated yarn cutting knives.

As most clearly illustrated in Fig. 11, the sliding cam bar 73 provides two horizontal channels 94 and 95 connected by an oblique channel 96. It will be understood that when any one of the rollers 88 rests in the channel 94 its associated hook member 87 will be in lowered position, as illustrated in Fig. 5, and that when the roller rests in channel 95 its associated hook member will be in raised position, as illustrated in Fig. 4. As has been previously explained, the sliding cam bar 73 is moved transversely of the machine during the weaving operation and thus as the bar is so moved the hooks are successively depressed and raised for the purposes to be more fully hereinafter pointed out.

As is most clearly illustrated in Figs. 12 and 13, each of the hook members 87 is provided with a longitudinal slot 97 in which is arranged to travel a yarn cutting knife 98, each of the knives 98 being fixed to a block 99 having dovetailed sliding connection with its associated hook. Each of the slidable knife carrying blocks 99 is connected by means of a link 100 with a crank arm 101 fixed upon a shaft 102, which shaft is disposed directly above the shaft 79 and is freely journaled in the blocks 81, as is most clearly illustrated in Figs. 4, 5, and 6. At its right hand end (Fig. 1) the shaft 102 is provided with a crank arm 103 connected by a link 104 with certain operating devices to be presently explained. Thus it will be seen that when the crank arm 103 and link 104 are in the positions indicated by dotted lines in Fig. 5, the knives 98 will be held in retracted position, and that when the crank arm 103 is thrown into the position indicated in dotted lines in Fig. 6, the knives 98 will simultaneously be moved to cut any yarn that may be engaged by the hooks 87.

In the introduction to the specification I have stated that when the yarn tube 70 moves from right to left (Fig. 1) it leaves behind it "plug" yarn which is later picked up by the hooks 87. Inasmuch as the "plug" yarn is carried in the shed of the warp, and inasmuch as the hooks are disposed between the several strands of the upper warp it will be seen that when the sliding cam bar is operated to effect the lifting of the hooks the strands of the upper warp would be deflected from their proper plane were some means not provided to prevent this happening. I prevent distortion of the upper warp by providing a series of fingers 105 which lie between the several hook elements 87 and in the plane of the upper warp, the said fingers 105 being fixed to a transverse bar 106 and extending forwardly therefrom, as is clearly illustrated in Figs. 3 and 5. The ends of the transverse bar 106 are connected to the long arms 107 of bell crank levers 108 journaled upon the shaft 86. The shorter arm 109 of each of the bell crank levers 108 is slightly curved, as is most clearly illustrated in Fig. 5, and is provided at its free end with a roller 110 arranged to engage in a bracket, or guide, 111 supported by its adjacent bracket 75. Since all of the mechanism last described is supported by the sliding bars 76 mounted upon the bracket 75, it will be seen that when the bars 76 are in the positions illustrated in Fig. 5 the fingers 105 will be held in the positions illustrated in Fig. 5 and that when the sliding bars 76 are moved to the positions illustrated in Fig. 6 the fingers 105 will be thrown upwardly to the position also clearly illustrated in Fig. 6.

I shall now describe the mechanism for moving the sliding bars 76, and parts carried thereby, upon the supporting brackets 75. Each of the sliding bars 76 has fixed on the outer face thereof a rack 112, the teeth of which coöperate with a gear sector 113, each of the gear sectors 113 being keyed upon a shaft 114, as is clearly illustrated in Figs. 4 and 5. Fixed to the shaft 114 is a crank arm 115 connected by means of a link 116 with a rod 117 extending down along the front of the machine frame 20 and being at its lower end connected by means of a link 118 with the long arm of a lever 119, as is most clearly illustrated in Fig. 2. The lever 119 is pivoted at 120 and is connected by means of a link 121 to the long arm of a bell crank lever 122, in turn pivoted at 123. The shorter arm of the bell crank lever 122 is provided with a roller 124 engaging in a cam slot formed in the cam element 125. The slot in the cam element 125, as is clearly illustrated in Fig. 2, consists of two portions, one of which is more distant from the axis of the cam than is the other portion. It will thus be understood that when the roller carried by the shorter arm of the bell crank 122 passes from that portion of the cam slot less distant from the axis of the cam to the other portion of the cam slot, the gear sectors 113 will be operated to carry the sliding bars 76 forward, and that when the roller 124 travels from that portion of the cam slot more distant from the axis of the cam the gear sectors will be actuated to move the sliding bars 76, and parts carried thereby, rearwardly. As has been previously explained, when the sliding bars 76, and parts carried thereby, are moved forwardly the fingers 105 are thrown upwardly, and when the sliding bars 76, and parts carried thereby, are moved rearwardly the fingers are moved downwardly.

I have already indicated that the knives 98 associated with the several hook elements 87 are actuated through mechanism connected with the link 104, but have not as yet described the mechanism for actuating the link 104. As is most clearly illustrated in Figs. 1 and 2, the link 104 extends downwardly to near the bottom of the machine frame 20 where it is connected to a lever 130 having one end thereof pivoted to the machine frame. A link 130ᵃ is interposed between the lever 130 and a crank 131 fixed upon a shaft 132, which shaft also has fixed thereon an arm 133 connected by means of a link 134 with a crank arm 135 fixed with respect to an intermittent pinion 136 mounted upon a shaft disposed above the axis of the main shaft 21. The intermittent pinion 136 coöperates with an intermittent gear 137 mounted upon the main shaft 21. It will be seen that each time the intermittent pinion 136 is turned 360 degrees the several yarn cutting knives are, by virtue of the connections just described, actuated. As has been previously explained, the blocks 81, which serve in part to support the yarn lifting hooks, etc., are movable transversely of the machine within certain limits. The link 104, being relatively long, permits the slight movement of the parts transversely of the machine to occur without impairing the operation of the controlling mechanism for the yarn cutting knives 98.

I have previously explained that the blocks 81, and parts carried thereby, are movable transversely of the machine within certain limits, and have also pointed out that the coiled spring 84 tends to move the blocks 81, and parts carried thereby, toward the left side of the machine (Figs. 1 and 3), but I have not as yet described the mechanism for moving the blocks 81, and parts carried thereby, toward the right hand side of the machine against the tension of the spring 84. This, I will now proceed to do.

Mounted upon the forward end of the left hand one of the slidable blocks 76 (Fig. 3) is a star wheel 140 which has fixed relatively thereto an oval cam 141, which cam when it is in the position illustrated in Fig. 3, is arranged to hold the blocks 81, and parts carried thereby to the right against the action of the spring 84. It will be seen, however, that when the oval cam 141 is turned through an angle of 90 degrees the spring 84 will serve to throw the blocks 81, and parts carried thereby, to the left. In other words, the oval cam 141 has four positions in two of which it serves to retain the blocks 81, and parts carried thereby, to the right against the action of the spring 84. In its two other positions it permits the spring 84 to hold the blocks 81, and parts carried thereby, to the left. Disposed in proximity to the star wheel 140, and supported by a fixed part of the machine, in the present instance by one of the brackets 75, is a small bracket 142 to which is pivoted a latch 143 provided with a pin 144 extending upwardly into the path of the star wheel 140. A coiled spring, associated with the latch 143, normally tends to retain it in the position illustrated in Figs. 3 and 5 of the drawings. It will be seen from the drawings that when the movable bars 76, and parts supported thereby, are, upon actuation of the gear sectors 113, moved to forward position the star wheel will be carried with the movable bars 76 inasmuch as it is supported by one of them and will engage the upwardly projecting pin 144 which will, however, yield and permit the star wheel to pass without imparting rotation to the star wheel. When, however, the sliding bars 76, and parts carried thereby, are moved rearwardly the latch 143 will not yield and will, therefore, impart a one step advancement to the star wheel, thereby moving the oval cam 141 through an angle of 90 degrees. As is most clearly illustrated in Figs. 5 and 7, the oval cam 141 exercises its control over the blocks 81, and parts carried thereby, through a forwardly extending arm 145 secured to the left hand one of the blocks 81 (Figs. 1 and 3).

As is well understood by persons familiar with the art of weaving, the several warp strands are alternately arranged and, therefore, when the shed is changed the strands that formerly were in the upper plane are in the lower plane. Consequently, if it be supposed that the warp strand nearest the left hand side of the machine be in the upper plane for one position of the shed changing heddles it will be seen that this strand will lie in the lower plane when the heddles are changed. I provide the beforementioned means for moving the blocks 81, and parts carried thereby, from right to left to automatically adapt the parts for operation for the different positions of the warp strands caused by the changing of the heddles.

As is clearly illustrated in Fig. 3, the right hand end of the plug yarn carrying tube 70 is arranged to extend between the upper and lower warp and in the path of the batten. I have already described how the left hand end of the yarn tube 70 is mounted to be turned out of the path of the batten when the latter moves forwardly, but I have not as yet described the mechanism for turning the yarn tube upon its pivot. Pivoted to the left hand one of the sliding bars 76 and movable therewith is a rearwardly extending arm 150 provided at its rear end with an elongated slot 151 through which the right hand end of the plug yarn tube 70 extends. It will thus be seen that when the sliding bars 76, and parts carried thereby, are moved forwardly the arm 150, due to its lost motion connection with the yarn tube 70, will carry the latter out of the path of the batten frame, as is clearly illustrated in Fig. 6.

I shall now describe the means for catching and retaining the end of the plug yarn carried by the tube 70 when the latter is moved transversely of the machine from right to left, but shall defer explanation of the operation of this yarn catcher until I explain the operation of the machine as a whole.

As is most clearly illustrated in Fig. 3, the shaft 86 has keyed thereon near its right hand end a pair of spaced collars 155 and 156. Disposed adjacent the collar 156 and journaled upon the shaft 86 is an arm 157 which has pin and slot connection with the collar 156, as is most clearly illustrated in Fig. 4. Extending laterally from the arm 157 is a pin 158 which is engaged by one end of a coiled spring 159 disposed upon the shaft 86 between the collars 155 and 156 and having its other end fixed with respect to the collar 155. Thus it will be seen that the coiled spring 159 normally tends to move the yarn catcher arm in a clockwise direction (Fig. 4).

I have not as yet described the shuttle mechanism which forms a part of my present mat weaving machine. I shall, therefore, now take up the description of the shuttle mechanism.

Extending laterally from each side of the machine frame 20 are horizontal bars 160—160, which are identical in construction and, therefore, a description of one will suffice for both. Each of the bars 160 is provided on its rear face with a dovetailed rib 161, and mounted for reciprocation upon each of the bars 160 is a block 162. Each of the blocks 162 is conveniently provided with a wearing strip 163, as is most clearly illustrated in Fig. 10. Extending laterally from each of the reciprocating blocks 162 is a pin 164 engaging in an elongated slot 165 formed in the free end of a lever 166 pivoted at 167 to a bracket 168 carried by the machine frame 20. Formed in each of the levers 166 near its pivoted end is an elongated slot 169 in which engages a pin 170 carried by a link 171, as is most clearly illustrated in Fig. 1. Each of the links 171 is also connected to a crank arm 172 fixed with respect to an intermittent pinion 173 coöperating with an intermittent gear 174, which intermittent gear 174 is common to both of the pinions 173. Due to the construction just described it will be seen that when the intermittent gear 174 is turned through one complete revolution it will first operate to rotate one of the intermittent pinions 173 and thereby cause the block 162 connected with said pinion to be moved upon its associated bar 160 and returned to normal position, the intermittent gear then operating the other one of the intermittent pinions to actuate it and the reciprocating block 162 connected thereto in precisely the same manner.

Figure 16:
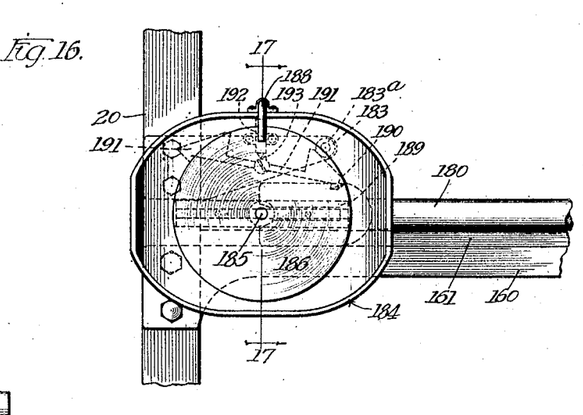
Fig. 16 is a fragmentary plan view of the shuttle and its controlling devices, the parts being shown disposed closer together than is actually the case because of lack of room upon the drawing sheet.
Figure 17:
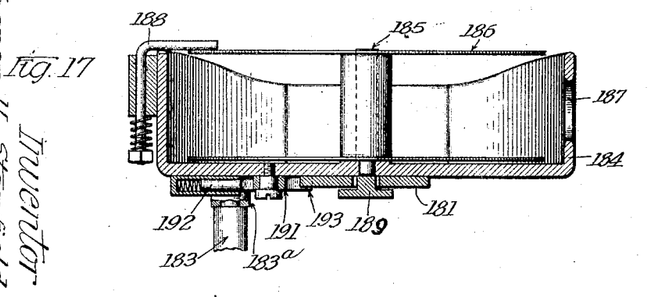
Fig. 17 is a cross sectional view taken on the line 17—17 of Fig. 16 and looking in the direction indicated by the arrows.
Figure 18:
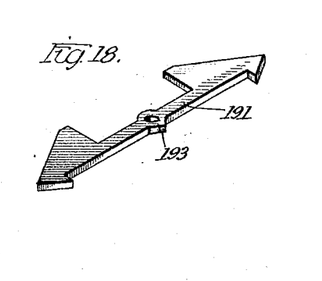
Fig. 18 is a detail view in perspective of the pivoted latch forming a part of the shuttle controlling mechanism.

Carried by each of the reciprocating blocks 162, as is most clearly shown in Fig. 10, is a rod 180 provided at its inner end with a forked bifurcated portion 181. Located adjacent the inner end of each of the rods 180, and supported by the machine frame, is a laterally projecting bracket 182 provided with an upwardly extending pin 183 carrying a roller 183ª the function of which will presently be made apparent. At 184 I have illustrated a shuttle tray provided with an upwardly extending post 185 arranged to pivotally support a shuttle spool 186, the said tray provided at one side thereof with an elongated slot 187 through which the yarn may pass. A spring pressed element 188 normally bears against the top of the spool 186 and prevents turning of the spool except when yarn is being drawn off of the same. Fixed upon the bottom of the tray 184 is a bar 189 having substantially the cross section of an inverted T. In Fig. 16 of the drawings the tray 184 is illustrated as associated with the rod 180 located on the right hand side of the machine, and it will be seen that the bifurcated portion 181 of this rod engages the bar 189, as is most clearly illustrated in Fig. 17. Each of the bifurcated portions 181 of the rods 180 is provided with a notch 190 arranged to be engaged by a latch 191 pivoted upon the bottom of the tray 184. As is illustrated in Fig. 16, the right hand end of the latch 191 is retained in engagement with the notch 190 in the portion 181 of the right hand bar 180 by a spring pressed plunger 192 which coöperates with a lug 193 formed upon the latch 191 at its pivotal point. Let us assume that the right hand one of the rods 180 moves across the machine from right to left. When this occurs the shuttle tray 184 is, of course, carried with it and when the left hand end of the latch 191 engages the roller 183ª located adjacent the inner end of the left hand one of the rods 180 the latch is turned upon its pivot thereby disconnecting the tray from the right hand rod 180 and connecting it with the left hand rod 180 and permitting the right hand rod 180 to return to its normal position. When the left hand rod 180 is later moved across the machine from left to right this operation is repeated, the shuttle tray being this time disconnected from the left hand rod 180 and connected with the right hand rod 180. I find that the form of shuttle mechanism just described is a highly desirable one because of its positive operation, but I wish to be understood that I do not limit myself to any particular form of shuttle mechanism.

Having now described the construction of my improved mat weaving machine I shall proceed to explain the operation thereof.

It will be understood that the yarn carrying tube 70 normally has a strand, or strands, of yarn extending therethrough, this yarn being supplied from a coil located adjacent the machine, or supplied from a suitable spool. I contemplate utilizing my present mat weaving machine for weaving mats of cocoa yarn and due to the character of the yarn I find that the friction of the yarn within the tube is sufficient to prevent the yarn from being drawn out of the yarn tube when the latter is moved transversely of the machine from left to right. We shall assume that the warp strands have been properly "faced up" and that we are ready to weave a mat comprising strands, fillers and "plugs". Assuming the several parts to be in the positions illustrated in Fig. 7, the yarn tube 70 is moved transversely of the machine and between the upper and lower warp strands. As the tube 70 thus moves from left to right the several hooks 87 are successively depressed in front of the end of the yarn tube due to the fact that the sliding cam bar 73 is mechanically connected with the yarn tube 70. Thus when the yarn tube 70 reaches the end of its stroke from left to right the several hooks 87 are depressed to the positions illustrated in Fig. 5. As the yarn tube 70 starts to move back between the warp, the one of the hooks 87 nearest the right hand side of the machine (Fig. 3) is raised due to the action of the cam bar and the end of the yarn extending from the yarn tube 70 is caught between said hook element 87 and the yarn catching finger 157, as is clearly illustrated in Fig. 4. As the yarn tube 70 continues to travel back to its normal position the other hooks 87 are successively raised, thus carrying the loops of the yarn up between the several strands of the upper warp. The several fingers 105 lying adjacent the strands of the upper warp effectually serve to prevent the strands of the upper warp from being deflected from their proper plane when the loops of yarn are thus formed by the raising of the hook elements 87.
After the yarn tube 70 and hook elements 87 have been operated as has just been described, the gear sectors 113 are actuated through their associated controlling mechanisms to move the sliding bars 76 forwardly, thus carrying the free end of the yarn tube 70 out of the path of the batten and lifting the several fingers 105 to the positions illustrated most clearly in Fig. 6. When this occurs the hook elements 87 travel forward to carry the plug yarn down against the previously woven yarn. The shuttle mechanism then operates to carry a strand, or strands, of yarn between the upper and lower warp. After the operation of the shuttle mechanism the heddles begin to operate to change the shed of the warp and the batten moves forward to move the yarn binder and plug yarn up against the previously woven yarn. While the batten is in engagement with the filler yarn and plug yarn, as has just been explained, the knives 98 are operated to cut into "plugs" the several loops of yarn carried by their associated hook elements 87. The batten then drops back and delivers a quick blow to drive the filler yarn and plug yarn tightly into engagement with the previously woven yarn. The gear sectors 113 are then actuated to return the sliding bars 76 to normal position, thus returning the fingers 105 and plug yarn tube to normal position. It will be understood, however, that when the sliding bars 76 are returned to normal position the blocks 81, and parts carried thereby, are shifted transversely of the warp to take care of the different positions of the strands of the upper warp occasioned by the changing of the shed.

The operation above described is then resumed.

It will be understood that for each operation of the plug yarn tube 70 to carry plug yarn between the warp, as has been previously explained, the shuttle moves once across the machine and that, therefore, the plug yarn tube and sliding cam bar travel twice across the machine for each journey of the shuttle transversely of the machine.

It will, moreover, be understood that for every other complete cycle of the plug yarn carrying tube and sliding cam bar, the blocks 81, and parts carried thereby are in their left hand positions and during the intervening cycles of the plug yarn tube and sliding cam bar the blocks 81, and parts carried thereby, are in their right hand position.

I have not attempted to illustrate any modification of my present invention for the reason that this would entail a large number of additional sheets of drawings and a more lengthy specification. Therefore, I do not limit myself to the particular construction herein shown and described, but, on the other hand, desire to claim all equivalent constructions coming within the terms and spirit of the appended claim.

What I claim as new and desire to secure by United States Letters Patent is:

A mat weaving machine comprising in combination warp supporting and shed changing mechanism, a yarn carrier movable in and transversely of the shed of the warp, a movable cam bar, a channel therein, and a plurality of pivoted loop lifting levers of the first class, each loop lifting lever comprising a hooked arm and a second arm bearing in said movable cam bar.

In witness whereof, I hereunto subscribe my name this 28th day of October, A. D. 1915.

JASPER H. STANFIELD.

Witnesses:
 MINA HOMMES,
 TIEDE CLOCK.

Copies of this patent may be obtained for five cents each, by addressing the "Commissioner of Patents, Washington, D. C."